United States Patent
Howard et al.

(10) Patent No.: US 7,142,217 B2
(45) Date of Patent: Nov. 28, 2006

(54) SYSTEM AND METHOD FOR SYNCHRONIZING RASTER AND VECTOR MAP IMAGES

(75) Inventors: John Willard Howard, Keller, TX (US); Dan Martin Scott, Irving, TX (US); Darin Wayne Higgins, Fort Worth, TX (US)

(73) Assignee: SourceProse Corporation, Euless, TX (US)

( * ) Notice: Subject to any disclaimer, the term of this patent is extended or adjusted under 35 U.S.C. 154(b) by 51 days.

(21) Appl. No.: 09/820,552

(22) Filed: Mar. 29, 2001

(65) Prior Publication Data

US 2001/0026270 A1 Oct. 4, 2001

Related U.S. Application Data

(63) Continuation of application No. 09/537,162, filed on Mar. 29, 2000.

(51) Int. Cl.
*G09G 5/14* (2006.01)
(52) U.S. Cl. .................. 345/581; 345/211; 345/213; 345/214
(58) Field of Classification Search .......... 345/427, 345/569, 665, 667, 682, 629, 213, 581, 619, 345/211, 214
See application file for complete search history.

(56) References Cited

U.S. PATENT DOCUMENTS

| | | |
|---|---|---|
| 4,254,467 A | 3/1981 | Davis et al. |
| 4,458,330 A | 7/1984 | Imsand et al. |
| 4,737,916 A | 4/1988 | Ogawa et al. ............ 364/443 |
| 4,852,183 A | 7/1989 | Abe et al. |
| 4,876,651 A | 10/1989 | Dawson et al. |
| 4,885,706 A | 12/1989 | Pate et al. ............. 364/551.01 |
| 4,899,136 A | 2/1990 | Beard et al. |
| 5,018,210 A | 5/1991 | Merryman et al. |
| 5,050,222 A | 9/1991 | Lee |
| 5,113,517 A | 5/1992 | Beard et al. |
| 5,233,335 A | 8/1993 | Berwin |
| 5,247,356 A * | 9/1993 | Ciampa .................... 348/144 |
| 5,274,752 A | 12/1993 | Kawazome |
| 5,323,317 A | 6/1994 | Hampton et al. |

(Continued)

FOREIGN PATENT DOCUMENTS

EP    WO 90/14627    11/1990

(Continued)

OTHER PUBLICATIONS

Under the hood of GeoVRML 1.0 Martin Reddy, Lee Iverson, Yvan G. Leclerc Feb. 2000 Proceedings of the fifth symposium on Virtual reality modeling language (Web3D-VRML).*

(Continued)

*Primary Examiner*—Kee M. Tung
*Assistant Examiner*—J. Amini
(74) *Attorney, Agent, or Firm*—Finnegan, Henderson, Farabow, Garrett & Dunner, L.L.P.

(57) ABSTRACT

A system and method for coordinated manipulation of multiple displayed maps, even when the maps use different internal coordinate systems. According to this embodiment, each map image to be displayed is first georeferenced, to provide a set of conversion functions between each map's internal coordinate system and a geographic coordinate system, which is latitude/longitude in the preferred embodiment. After this is done, any point on each map can be referenced using the geographic coordinate set. Since this is the case, the maps can now be manipulated, edited, and annotated in a synchronized manner, by defining the manipulations in terms of the geographic coordinate system, and using the georeferencing functions to translate the manipulation to each map's internal coordinate system.

11 Claims, 5 Drawing Sheets

U.S. PATENT DOCUMENTS

| | | |
|---|---|---|
| 5,381,338 A | 1/1995 | Wysocki et al. |
| 5,396,582 A | 3/1995 | Kahkoska |
| 5,406,342 A | 4/1995 | Jongsma |
| 5,414,462 A | 5/1995 | Veatch .................. 348/135 |
| 5,418,906 A | 5/1995 | Berger et al. |
| 5,422,989 A | 6/1995 | Bell et al. ............... 395/133 |
| 5,428,546 A | 6/1995 | Shah et al. |
| 5,467,271 A | 11/1995 | Abel et al. .............. 364/420 |
| 5,487,139 A * | 1/1996 | Saylor et al. ............ 345/629 |
| 5,592,375 A | 1/1997 | Salmon et al. .......... 395/207 |
| 5,594,650 A | 1/1997 | Shah et al. |
| 5,596,494 A | 1/1997 | Kuo ........................ 364/420 |
| 5,608,858 A | 3/1997 | Kurosu et al. |
| 5,623,679 A | 4/1997 | Rivette et al. |
| 5,623,681 A | 4/1997 | Rivette et al. |
| 5,631,970 A | 5/1997 | Hsu |
| 5,638,501 A | 6/1997 | Gough et al. |
| 5,640,468 A | 6/1997 | Hsu |
| 5,659,318 A | 8/1997 | Madsen et al. |
| 5,682,525 A | 10/1997 | Bouve et al. |
| 5,699,244 A | 12/1997 | Clark, Jr. et al. ........ 364/420 |
| 5,699,255 A | 12/1997 | Ellis et al. |
| 5,715,331 A | 2/1998 | Hollinger |
| 5,719,949 A | 2/1998 | Koeln et al. |
| 5,734,756 A | 3/1998 | Sherman et al. |
| 5,748,777 A | 5/1998 | Katayama et al. |
| 5,748,778 A | 5/1998 | Onoguchi |
| 5,757,359 A | 5/1998 | Morimoto et al. |
| 5,771,169 A | 6/1998 | Wendte |
| 5,815,118 A | 9/1998 | Schipper |
| 5,842,148 A | 11/1998 | Prendergast et al. ........ 702/34 |
| 5,848,373 A | 12/1998 | DeLorme et al. .......... 701/200 |
| 5,857,199 A | 1/1999 | Tamano et al. |
| 5,884,216 A | 3/1999 | Shah et al. ............... 701/207 |
| 5,884,219 A | 3/1999 | Curtwright et al. |
| 5,892,909 A | 4/1999 | Grasso et al. |
| 5,902,347 A | 5/1999 | Backman et al. .......... 701/200 |
| 5,904,727 A * | 5/1999 | Prabhakaran ............ 701/208 |
| 5,907,630 A | 5/1999 | Naoi et al. |
| 5,929,842 A | 7/1999 | Vertregt et al. |
| 5,929,865 A | 7/1999 | Balz et al. |
| 5,930,474 A | 7/1999 | Dunworth et al. |
| 5,937,014 A | 8/1999 | Pelin et al. |
| 5,961,572 A | 10/1999 | Craport et al. |
| 5,966,135 A | 10/1999 | Roy et al. |
| 5,966,469 A | 10/1999 | Moon et al. |
| 5,969,723 A | 10/1999 | Schmidt |
| 5,969,728 A | 10/1999 | Dye et al. |
| 5,974,423 A | 10/1999 | Margolin |
| 5,978,804 A * | 11/1999 | Dietzman .................. 707/10 |
| 5,986,697 A | 11/1999 | Cahill, III |
| 5,987,136 A | 11/1999 | Schipper et al. |
| 5,987,173 A | 11/1999 | Kohno et al. |
| 5,987,380 A | 11/1999 | Backman et al. |
| 5,991,780 A | 11/1999 | Rivette et al. |
| 5,995,023 A | 11/1999 | Kreft |
| 5,999,878 A | 12/1999 | Hanson et al. |
| 6,005,509 A | 12/1999 | Buckreuss |
| 6,006,161 A | 12/1999 | Katou |
| 6,008,756 A | 12/1999 | Boerhave et al. |
| 6,032,157 A * | 2/2000 | Tamano et al. ........ 707/104.1 |
| 6,044,324 A | 3/2000 | Boerhave et al. |
| 6,061,618 A | 5/2000 | Hale et al. |
| 6,084,989 A * | 7/2000 | Eppler ...................... 382/293 |
| 6,119,069 A | 9/2000 | McCauley |
| 6,144,920 A | 11/2000 | Mikame |
| 6,148,260 A | 11/2000 | Musk et al. |
| 6,161,105 A | 12/2000 | Keighan et al. |
| 6,202,023 B1 | 3/2001 | Hancock et al. |
| 6,218,965 B1 | 4/2001 | Grendron et al. |
| 6,236,907 B1 | 5/2001 | Hauwiller et al. |
| 6,249,742 B1 | 6/2001 | Friederich et al. |
| 6,307,573 B1 | 10/2001 | Barros |
| 6,321,158 B1 | 11/2001 | DeLorme et al. .......... 701/201 |
| 6,339,745 B1 | 1/2002 | Novik |
| 6,377,210 B1 | 4/2002 | Moore |
| 6,377,278 B1 * | 4/2002 | Curtright et al. .......... 345/634 |
| 6,462,676 B1 | 10/2002 | Koizumi |
| 6,487,305 B1 | 11/2002 | Kambe et al. |
| 6,489,920 B1 | 12/2002 | Anders et al. |
| 6,504,571 B1 * | 1/2003 | Narayanaswami et al. ....... 348/231.99 |
| 6,505,146 B1 | 1/2003 | Blackmer |
| 6,538,674 B1 | 3/2003 | Shibata et al. |
| 6,549,828 B1 | 4/2003 | Garrot et al. |
| 6,565,610 B1 | 5/2003 | Wang et al. |
| 6,577,714 B1 | 6/2003 | Darcie et al. |
| 6,606,542 B1 | 8/2003 | Hauwiller et al. |
| 6,631,326 B1 * | 10/2003 | Howard et al. ................. 702/5 |
| 6,650,998 B1 | 11/2003 | Rutledge et al. |
| 6,678,615 B1 | 1/2004 | Howard et al. |
| 6,785,619 B1 | 8/2004 | Homann et al. |
| 2001/0026271 A1 | 10/2001 | Higgins et al. |
| 2001/0028348 A1 | 10/2001 | Higgins et al. |
| 2001/0033290 A1 | 10/2001 | Scott et al. |
| 2001/0033291 A1 | 10/2001 | Scott et al. |
| 2001/0033292 A1 | 10/2001 | Scott et al. |
| 2002/0035432 A1 | 3/2002 | Kubica et al. |
| 2002/0143469 A1 | 10/2002 | Alexander et al. |
| 2002/0145617 A1 | 10/2002 | Kennard et al. |
| 2002/0147613 A1 | 10/2002 | Kennard et al. |
| 2003/0052896 A1 | 3/2003 | Higgins et al. |
| 2005/0073532 A1 | 4/2005 | Scott et al. |

FOREIGN PATENT DOCUMENTS

| | | |
|---|---|---|
| EP | 0 454 129 A2 | 10/1991 |
| EP | 0 619 554 A2 | 10/1994 |
| EP | WO 97/49027 | 12/1997 |
| JP | 11296540 A | 10/1999 |

OTHER PUBLICATIONS

Using high performance GIS software to visualize data: a hands-on software demonstration Linda Burton, William Hatchett, Mari Hobkirk, Charles Powell Nov. 1998 Proceedings of the 1998 ACM/IEEE conference on Supercomputing (CDROM.*

The role of government in standards Gio Wiederhold Dec. 1993 StandardView, vol. 1 Issue 2.*

The application of computer graphics to environmental planning Paul M. Wilson Jan. 1980 Proceedings of the ACM 1980 annual conference.*

Li et al., "Accuracy Assessment of Mapping Products Produced from the Star-3i Airborne IFSAR System".

Fukunaga et al., "Image Registration Using an Image Graph and its Application to Map Matching," IEE Proceedings-E, vol. 138, No. 2, Mar. 1991.

Wang, "Integrating GIS's and Remote Sensing Image Analysis Systems by Unifying Knowledge Representation Schemes," IEEE Transactions on Geoscience and Remote Sensing, vol. 29, No. 4, p. 656-664, Jul. 1991.

Roux, "Automatic Registration of Spot Images and Digitized Maps," IEEE, p. 625-628, 1996.

Noah Radford, "The Use of GIS in Flood Hazard Analysis: A Report for the City of Warwick and Project Impact," Jun. 1999.

"R2V: Advanced Raster to Vector Conversion Software for Automated Map Diglitzing," Able Software Corp., Sep. 20, 1999, pp. 1-4.

CDS Mapping Systems, et al., "CDS Business Mapping," Feb. 2, 1999. http://web.archhive.org/web/19990202115053/www/cdsys.com/index.html.

GeoPlace.com et al., "Mapping Awareness" 1999 http://web.archive.org/web/20000301085059/www/geoplace.com/archives.asp.

Fekete, Jean-Daniel et al., "Using the Multi-layer Model for Building Interactive Graphical Applications," ACM, pp. 109-118, 1996.

WiseImage X Quick Start, Consistent Software, 2000-2005, p. 1-77.

WiseImage X for Windows, IDEAL.com, 2000-2005, p. 1-2.

* cited by examiner

SYSTEM AND METHOD FOR SYNCHRONIZING RASTER AND VECTOR MAP IMAGES

CROSS REFERENCE TO RELATED APPLICATIONS

This application is a continuation of and claims priority from pending U.S. patent application "System and Method for Synchronizing Raster and Vector Map Images", (Ser. No. 09/537,162) filed Mar. 29, 2000. Furthermore, this application is related to and claims priority from the following pending applications: "System and Method for Performing Flood Zone Certifications" (Ser. No. 09/537,161) filed Mar. 29, 2000 and "System and Method for Georeferencing Digital Raster Maps" (Ser. No. 09/537,849) filed Mar. 29, 2000 which are hereby incorporated by reference.

BACKGROUND OF THE INVENTION

1. Technical Field

The present invention generally relates to graphic image manipulations and in particular to manipulation of map images. Still more particularly, the present invention relates to the coordinating the manipulation of multiple map images displayed on a data processing system.

2. Description of the Related Art

Modern geographic information systems normally make use of digital vector-based map information. However, a vast legacy of paper-based map information exists. It is very expensive and time consuming to convert all of the information on these paper maps over to a digital vector format. In many cases the scope and expense of such conversions renders them completely impractical. However, even when a complete conversion to digital vector-based format is not possible, it is still possible to obtain some of the benefits of computerized map systems, first by converting the paper maps to digital raster maps by digitally scanning them, and then by georeferencing the raster image.

A digital map image is said to be georeferenced if a pair of mathematical functions, f, and g, have been determined that can be used to convert back and forth between the coordinates of the map image (as defined by the pixels of the image) and the corresponding longitude and latitude of the location of that point. That is, f and g do the following:

1. If $(x, y)$ represents a location on the digital map image, then $f(x, y)=(Lon, Lat)$ represents the longitude and latitude of the corresponding physical location.
2. If $(Lon, Lat)$ represents a physical location that lies within the region covered by the map, then $g(Lon, Lat)=(x, y)$ represents the point on the digital map image that corresponds to that longitude and latitude.

Here, x and y represent the natural internal coordinate system of the map image. In most cases, a vector-based map image uses longitude and latitude as its internal coordinate system, if so, it can be considered to be trivially georeferenced already.

Typically a digital raster map image uses the pixels of its image as a kind of natural coordinate matrix. This type raster map image will require non-trivial georeferencing functions to convert back and forth between coordinate systems.

In a geographic information system, both raster maps and vector maps are often used, since raster maps can be easily obtained from the vast wealth of paper maps available, and vector maps can contain a great amount of underlying data. When each of these maps are displayed, users will typically desire to manipulate the view, by scrolling, zooming, or otherwise. If more than one map is being displayed, the user is typically required to independently manipulate each map to the desired view. It would be desirable to provide a means for a user to simultaneously manipulate both maps, even when the maps use different internal coordinate systems.

SUMMARY OF THE INVENTION

It is therefore one object of the present invention to provide improved graphic image manipulations.

It is another object of the present invention to provide improved manipulation of map images.

It is yet another object of the present invention to provide an improved system and method for coordinating the manipulation of multiple map images displayed on a data processing system.

The foregoing objects are achieved as is now described. The preferred embodiment provides a system and method for coordinated manipulation of multiple displayed maps, even when the maps use different internal coordinate systems. According to this embodiment, each map image to be displayed is first georeferenced, to provide a set of conversion functions between each map's internal coordinate system and a geographic coordinate system, which is latitude/longitude in the preferred embodiment. After this is done, any point on each map can be referenced using the geographic coordinate set. Since this is the case, the maps can now be manipulated, edited, and annotated in a synchronized manner, by defining the manipulations in terms of the geographic coordinate system, and using the georeferencing functions to translate the manipulation to each map's internal coordinate system.

The above as well as additional objectives, features, and advantages of the present invention will become apparent in the following detailed written description.

BRIEF DESCRIPTION OF THE DRWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
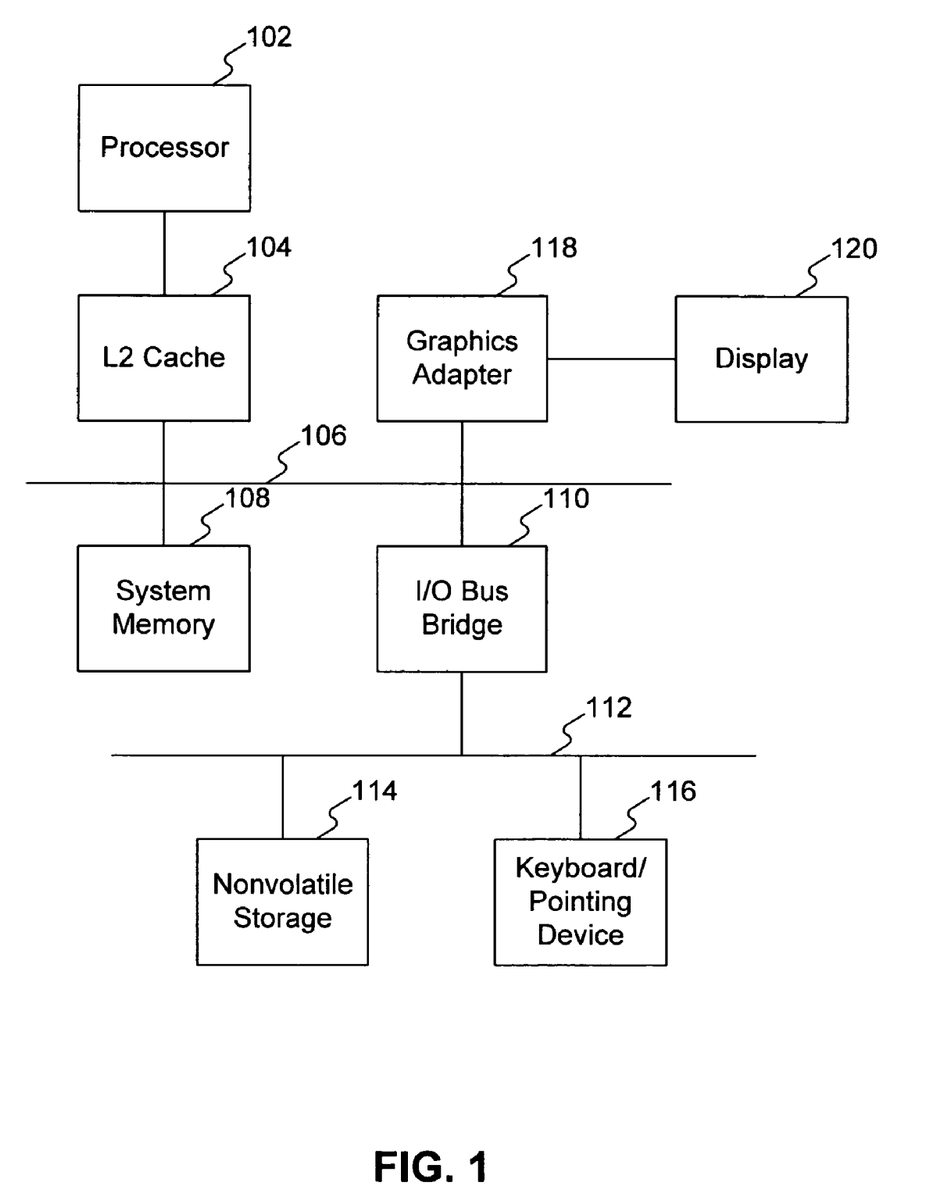
FIG. 1 depicts a data processing system in accordance with a preferred embodiment of the present invention.

With reference now to the figures, and in particular with reference to FIG. 1, a block diagram of a data processing system in which a preferred embodiment of the present invention may be implemented is depicted. Data processing system 100 includes processor 102 and associated L2 Cache 104, which in the exemplary embodiment is connected in turn to a system bus 106. System memory 108 is connected to system bus 106, and may be read from and written to by processor 102.

Also connected to system bus 106 is I/O bus bridge 110. In the exemplary embodiment, data processing system 100 includes graphics adapter 118 connected to bus 106, receiving user interface information for display 120. Peripheral devices such as nonvolatile storage 114, which may be a hard disk drive, and keyboard/pointing device 116, which may include a conventional mouse, a trackball, or the like, are connected to I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention. Data processing system 100 is provided solely as an example for the purposes of explanation and is not intended to imply architectural limitations.

The preferred embodiment provides a system and method for coordinated manipulation of multiple displayed maps, even when the maps use different internal coordinate systems. According to this embodiment, each map image to be displayed is first georeferenced, to provide a set of conversion functions between each map's internal coordinate system and a geographic coordinate system, which is latitude/longitude in the preferred embodiment. After this is done, any point on each map can be referenced using the geographic coordinate set. Since this is the case, the maps can now be manipulated, edited, and annotated in a synchronized manner, by defining the manipulations in terms of the geographic coordinate system, and using the georeferencing functions to translate the manipulation to each map's internal coordinate system. Once this has been done, it becomes possible to effectively display the information on a raster map in synchronization with information contained on other raster maps or on ordinary vector-based maps.

The preferred embodiment may be applied to any system which simultaneously displays multiple map images, but is particularly valuable for systems displaying a raster map image and a vector map image.

Map image synchronization is a method whereby two map images can be made to show the same geographic region at all times, maintaining this synchronization even after one of the images is panned, zoomed scrolled, or otherwise caused to display a different region. Whenever such a change occurs on one map, the system causes the same change to occur on the other map as well. In this way, the two images continue to display the same region, without the need of manually adjusting both maps. In addition the synchronization system allows annotations to be placed on either map at specified geographic locations, and causes a matching annotation to appear on the other map in the corresponding location.

The two maps in question may be any combination of digital raster and vector-based maps, as long as georeferencing information is available for both maps. According to the preferred embodiment, one map is a digital raster map, and the other map is a vector map, both maps covering the same geographic area. Multiple configurations of the map display are possible.

These include:
1. Both maps are displayed side by side, or one above the other on the computer display.
2. One map is superimposed directly on top of the other.
   a. The background of the top map is transparent, so that the user can see features of both the top map and the bottom map.
   b. Both maps are opaque, but a user may toggle back and forth rapidly between the two images.

Figure 2:
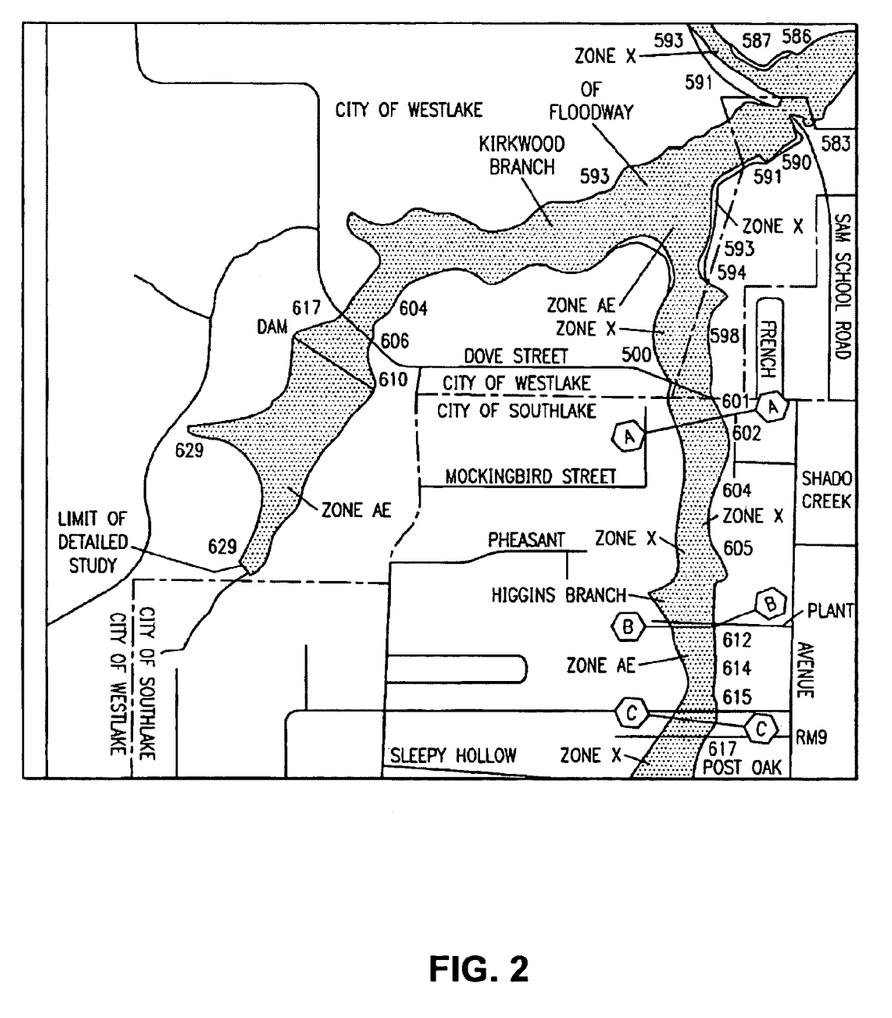
FIG. 2 is an exemplary raster map, in accordance with the preferred embodiment.

FIG. 2 is an exemplary raster map, in accordance with the preferred embodiment. This exemplary map shows a scanned image from a Federal Emergency Management Agency (FEMA) paper map. This raster image shows a land area with flood zone indications, but would, in a computer system, contain no underlying data regarding the area shown.

Figure 3:
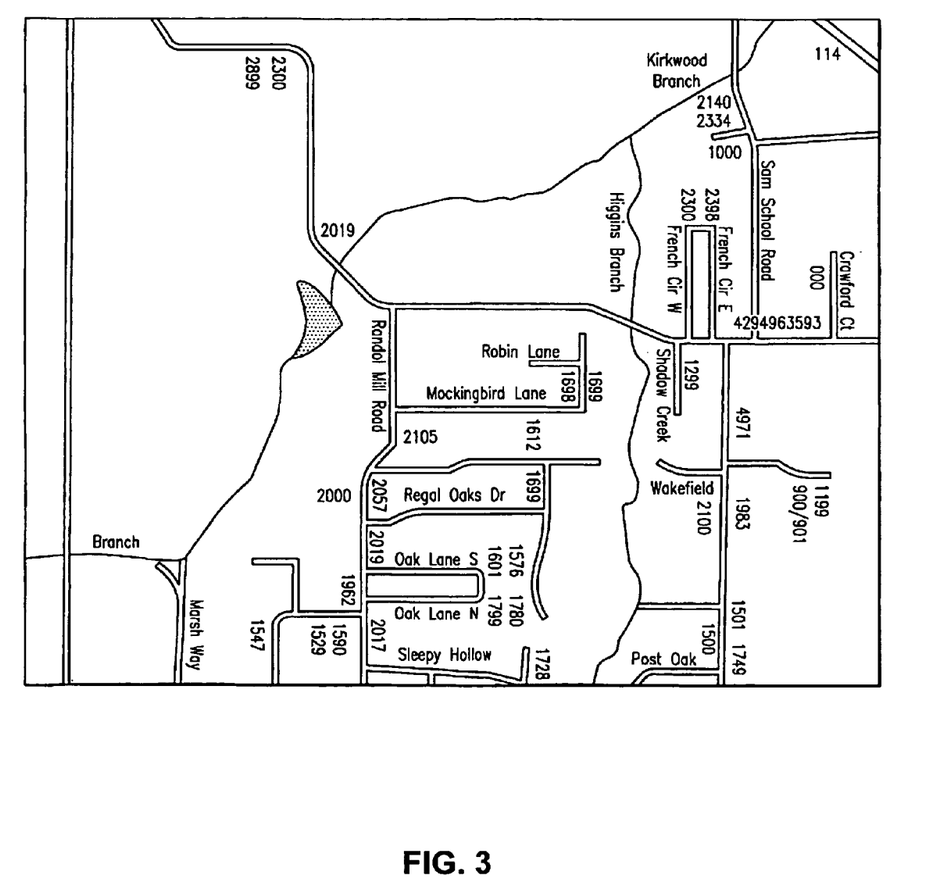
FIG. 3 is an exemplary vector map, corresponding to the raster map of FIG. 2, in accordance with a preferred embodiment of the present invention.

FIG. 3 is an exemplary vector map, corresponding to the raster map of FIG. 2, in accordance with a preferred embodiment of the present invention. This map shows the same area as the map in FIG. 2, but is created by a computer system from a database describing the locations of features such as the streets shown. Typically, each feature shown on a vector map such as this will already be georeferenced, in that the geographic coordinates of each feature will also be recorded in the underlying data.

Figure 4:
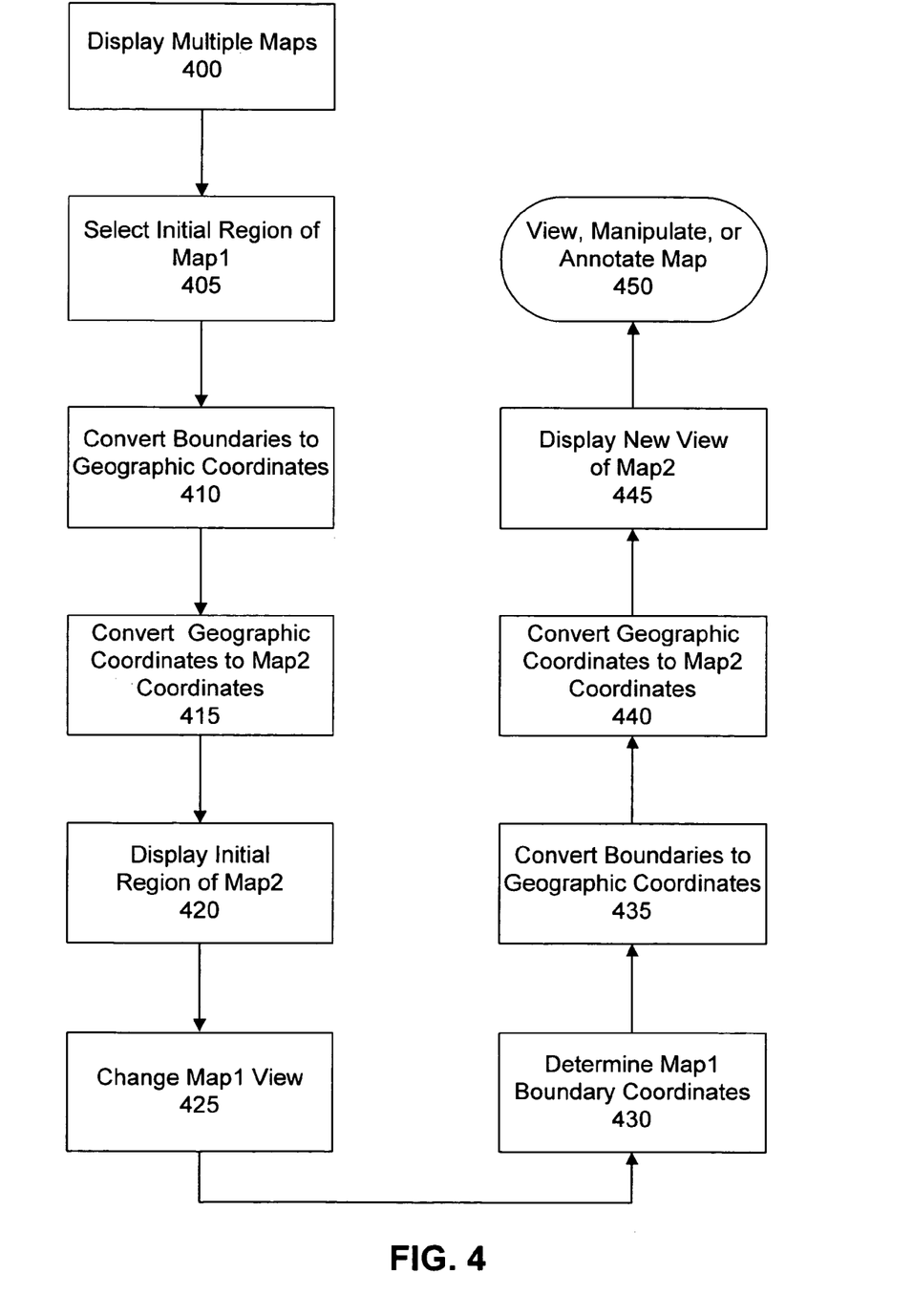
FIG. 4 is a flowchart of a process in accordance with a preferred embodiment of the present invention.
Figure 5:
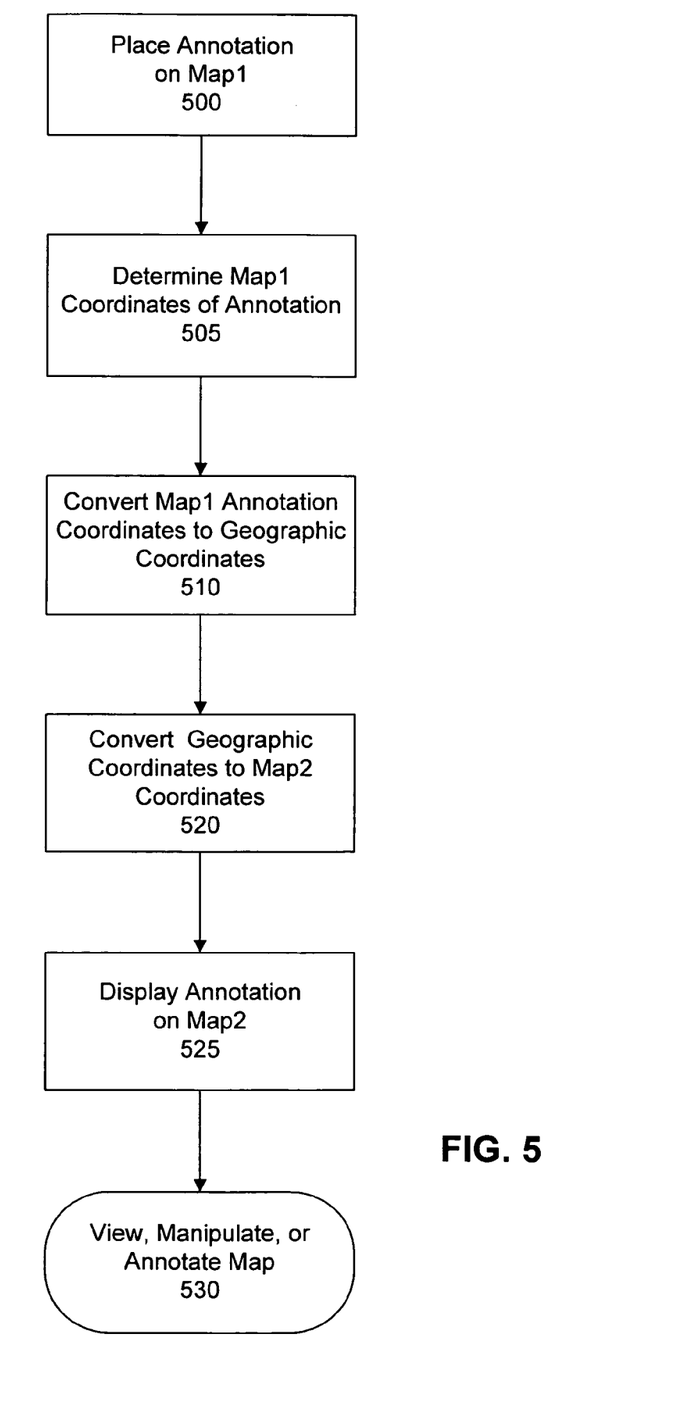
FIG. 5 shows a flowchart of a map annotation process

The process of the preferred embodiment, as shown in the flowcharts of FIGS. 4 and 5, operates in the following way:

FIG. 4 shows a map manipulation process in accordance with the preferred embodiment. First, the data processing system loads and displays two maps, Map1 and Map2, according to a user selection (step 400). For purposes of this example, assume that Map1 is a digital raster map, and Map2 is a vector map showing substantially the same region. It should be noted that the maps displayed are not required to cover identical geographic regions, as long as they share some geographic area in common. Both maps according to the preferred embodiment, are previously georeferenced. In an alternate embodiment, the system will allow the user to georeference one or both maps, if required.

Next, an initial geographic region, which is present on both maps, is selected on Map 1 and displayed by the system (step 405). Since Map1 has been georeferenced, the boundaries of the selected region are determined, using Map1's set of georeferencing functions, in terms of longitude and latitude (step 410).

The system then converts these boundaries, using the georeferencing function set of Map2, between the latitude/longitude boundaries of the display region and the internal coordinate system of Map2 (step 415). Next, the system displays the same region of Map2 (step 420), according to the same geographic boundaries.

Thereafter, as the user interacts with the system by causing one of the maps, Map1 in this example, to display a different geographic region or view (step 425), the system performs the following steps. Note that this manipulation by the user can include any change in the map view, including but not limited to scrolling, zooming, rotating, or changing the view perspective of the map, and that the user can be performing the manipulation on either map.

The system first determines the boundaries of the newly displayed region of Map1 in the natural coordinate system of Map1 (step 430). Next, the system uses the georeferencing function set of Map1 to convert the boundaries to be in terms of longitude and latitude (step 435).

The system then uses the georeferencing functions of Map2 to determine the boundaries of the new region in terms of the natural coordinate system of Map2 (step 440). The system then performs the appropriate image scaling and manipulation functions, known to those of skill in the art, to redraw Map2 with the same boundaries, and according to the same changes in scale and perspective, as Map1 (step 445). The user may then stop his manipulation and view the maps, continue to manipulate the maps, or annotate the map (step 450). Note that the steps above are performed rapidly enough, in the preferred embodiment, that it appears that the user is manipulating both maps in synchronicity.

FIG. 5 shows a flowchart of a map annotation process in accordance with the preferred embodiment. When the user places an annotation on one of the maps (step 500), Map1 in this example, then the system performs the following steps. First, the system determines the location of the new annotation of Map1 in the natural coordinate system of Map1 (step 505). Next, the system uses the georeferencing function set of Map1 to convert the annotation location to longitude and latitude (step 510). The system then uses the georeferencing function set of Map2 to express the annotation location to be in terms of the internal coordinate system of Map2 (step 520). Finally, the system displays the new annotation on Map2, in the location corresponding to the annotation on Map1 (step 525). The user may then stop his manipulation and view the maps, continue to manipulate the maps, or annotate the map (step 530). Again, the steps above are performed rapidly enough, in the preferred embodiment, that it appears that the user is annotating both maps in synchronicity.

Common changes, that might occur to change the region displayed include the user panning, zooming, or scrolling one of the images. Annotations may be used to designate points of particular interest on the maps.

Certain minor adjustments are required in the display if a region is selected which is not entirely present on one or more of the maps, or if the aspect ratios of the screen display areas devoted to each map are different. In the first case, the system attempts a "best fit" when one map selection included area is not found in the other map, and simply displays blank additional area to fill the missing region, so that the map windows will be filled and the synchronization of the images maintained. In the second case, the other map can be scaled to reflect the same area, or alternatively one or more of the map windows may be equipped with scroll bars, so that the effective dimensions of the map windows become identical.

A specific example, which illustrates the utility of map synchronization, arises from the "Flood Zone Determination" business, The Federal Emergency Management Agency (FEMA). FEMA publishes a library of tens of thousands of paper maps showing various types of flood zones and their locations in the United States. When performing a flood zone certification, a map analyst must locate a property on a flood map and determine the type of flood zone that the property is contained in. Unfortunately, these FEMA maps frequently display only a subset of geographic landmarks (such as streets). This often forces a map analyst to refer to a separate street map to find the property, and, once found, to determine the corresponding location on the flood map. Map synchronization greatly facilitates this process. For example, with both the flood map and the street map displayed side by side, the map analyst might 1. Locate the property on the street map, including performing whatever map manipulations are necessary to show the required area, having the flood map be manipulated by the system to reflect that same area;

2. Place an annotation on the street map at the location of the property wherein the system places an identical annotation at the corresponding point on the flood map; and 3. Observe the location of the synchronously placed annotation on the flood map, and make the required flood zone determination.

In this way, the map synchronization system has reduced the difficulty and time involved in making this determination by a great margin.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of synchronizing map images, comprising:
    selecting a boundary of a geographic region, which is present on both a first map and a second map, in the first map;
    converting first map coordinates designating the boundary of the geographic region selected on the first map into geographic coordinates using a georeferencing function of the first map;
    converting the geographic coordinates to corresponding second map coordinates designating the boundary of the geographic region on the second map using a georeferencing function of the second map; and
    automatically adjusting a boundary of the second map to correspond to the selected boundary in the first map when the boundary is selected in the first map.

2. The method of claim 1 further comprising receiving a user input to select a new geographic region in the first map.

3. The method of claim 2 further comprising determining a plurality of map coordinates for the new geographic region.

4. The method of claim 2 further comprising determining a plurality of map coordinates for a new boundary in the second map, such that the plurality of map coordinates in the second map correspond to the new geographic region that was selected in the first map.

5. The method of claim 3 further comprising configuring the new boundary of the first map for display.

6. The method of claim 4 further comprising configuring the new boundary of the second map for display.

7. The method of claim 1, further comprising:
    receiving a user input to select a new boundary of a new geographic area in the first map;
    determining geographic coordinates for the new boundary in the first map; and
    determining geographic coordinates for a new boundary of the new geographic area in the second map such that the geographic coordinates for the new boundary in the second map relate to the new boundary in the first map.

8. A computer readable medium containing instructions executable by a computer to perform a method to synchronize map images, the method comprising:
- selecting a boundary of a geographic region, which is present on both a first map and a second map, in the first map;
- converting first map coordinates designating the boundary of the geographic region selected on the first map into geographic coordinates using a georeferencing function of the first map;
- converting the geographic coordinates to corresponding second map coordinates designating the boundary of the geographic region on the second map using a georeferencing function of the second map; and
- automatically adjusting a boundary of the second map to correspond to the selected boundary when the boundary is selected in the first map.

9. A method of synchronizing map images, the method comprising:
- displaying a first map and a second map, wherein a background of the first map is transparent such that features of both the first map and the second map are visible;
- selecting a boundary of a geographic region, which is present on both the first map and the second map, in the first map;
- converting first map coordinates designating the boundary of the geographic region selected on the first map into geographic coordinates using a georeferencing function of the first map;
- converting the geographic coordinates to corresponding second map coordinates designating the boundary of the geographic region on the second map using a georeferencing function of the second map; and
- automatically adjusting a boundary of the second map to correspond to the selected boundary in the first map when the boundary is selected in the first map.

10. A computer readable medium containing instructions executable by a computer to perform a method of synchronizing map images, the method comprising:
- displaying a first map and a second map, wherein a background of the first map is transparent such that features of both the first map and the second map are visible;
- selecting a boundary of a geographic region, which is present on both the first map and the second map, in the first map;
- converting first map coordinates designating the boundary of the geographic region selected on the first map into geographic coordinates using a georeferencing function of the first map;
- converting the geographic coordinates to corresponding second map coordinates designating the boundary of the geographic region on the second map using a georeferencing function of the second map; and
- automatically adjusting a boundary of the second map to correspond to the selected boundary in the first map when the boundary is selected in the first map.

11. A system for map synchronizing map images, the system comprising:
- a map display;
- a map processing platform in communication with the map display, wherein the map processing platform is adapted to:
  - display a first map and a second map, wherein a background of the first map is transparent such that features of both the first map and the second map are visible;
  - select a boundary of a geographic region, which is present on both the first map and the second map, in the first map;
  - convert first map coordinates designating the boundary of the geographic region selected on the first map into geographic coordinates using a georeferencing function of the first map;
  - convert the geographic coordinates to corresponding second map coordinates designating the boundary of the geographic region on the second map using a georeferencing function of the second map; and
  - automatically adjust a boundary of the second map to correspond to the selected boundary in the first map when the boundary is selected in the first map;
- a storage platform coupled to the map processing platform; and
- a user interaction device coupled to the map processing platform.

* * * * *

UNITED STATES PATENT AND TRADEMARK OFFICE
CERTIFICATE OF CORRECTION

PATENT NO. : 7,142,217 B2 Page 1 of 1
APPLICATION NO. : 09/820552
DATED : November 28, 2006
INVENTOR(S) : John Willard Howard et al.

It is certified that error appears in the above-identified patent and that said Letters Patent is hereby corrected as shown below:

Claim 11, col. 8, line 16, "A system for map synchronizing map images" should read --A system for synchronizing map images--.

Title page, col. 1, Line 1
"(*) Notice: Subject to any disclaimer, the term of this patent is extended or adjusted under 35 U.S.C. 154(b) by 51 days."
should read
--(*) Notice: Subject to any dislaimer, the term of this patent is extended or adjusted under 35 U.S.C. 154(b) by 171 days.--

Signed and Sealed this

Sixth Day of March, 2007

JON W. DUDAS
*Director of the United States Patent and Trademark Office*